United States Patent [19]
Kurth
[11] 3,715,691
[45] Feb. 6, 1973

[54] ADJUSTABLE EQUALIZER HAVING MEANS RESPONSIVE TO THE INPUT AND OUTPUT SIGNALS OF EACH EQUALIZER SECTION

[75] Inventor: Carl Ferdinand Kurth, Andover, Mass.
[73] Assignee: Bell Telephone Laboratories, Incorporated, Murray Hill, N.J.

[22] Filed: Feb. 22, 1972
[21] Appl. No.: 227,742

[52] U.S. Cl. ....................................333/18, 325/65
[51] Int. Cl. .............................................H04b 3/04
[58] Field of Search .......333/18, 28 R, 70 T; 325/42, 325/65

[56] References Cited

UNITED STATES PATENTS 3,305,798 2/1967 Rappeport..............................333/18
3,508,172 4/1970 Kretzmer et al.......................333/18
3,573,667 4/1971 Kao et al. ..............................333/18
3,633,129 1/1972 Kao et al. ..............................333/18

*Primary Examiner*—Paul L. Gensler
*Attorney*—R. J. Guenther et al.

[57] ABSTRACT

In an adjustable equalizer comprising a plurality of independently adjustable, serially connected equalizer sections, precise signal information about the effect of each section in each of a plurality of frequency ranges is generated by apparatus which compares input and output signal levels of each equalizer section in each frequency range. This information is used in the processing of simultaneously generated signal information indicative of the overall misalignment of the equalizer to produce output signals suitable for controlling adjustment of the equalizer sections to reduce overall misalignment of the system.

11 Claims, 3 Drawing Figures

ADJUSTABLE EQUALIZER HAVING MEANS RESPONSIVE TO THE INPUT AND OUTPUT SIGNALS OF EACH EQUALIZER SECTION

BACKGROUND OF THE INVENTION

1. Field of the Invention

This invention relates to analog signal transmission systems and more particularly to automatic equalization in wideband, analog communications systems.

2. Description of the Prior Art

In long-distance analog signal transmission systems, elaborate precautions must be taken to prevent undue attenuation of the transmitted signals. The several varieties of repeater and equalizer devices employed for this purpose in one such system (i.e., the Bell System L–4 coaxial cable system) are described at length in a series of articles in Volume 48, Number 4, (April, 1969) of the *Bell System Technical Journal.* As discussed in the first article in this series, entitled, "The L–4 Coaxial System" by F. H. Blecher et al., a heirarchy of equalization devices is typically provided. These range from relatively simple, closely spaced, fixed repeaters to highly sophisticated, more remotely located, adjustable equalizers.

The purpose of an adjustable equalizer in a system of this type is to insure that the section of transmission line served by the equalizer (including whatever intermediate repeaters and equalizers there may be) maintains the desired frequency response despite any change in the characteristics of the transmission line. It will usually be desired that the frequency response of the line have a predetermined constant amplitude for all frequencies in the operating band of the system.

One of the most widely used types of adjustable equalizers is the so-called bump equalizer. Equalizers of this type are employed in the Bell System L–4 coaxial system and are discussed in an article entitle, "Equalizing and Main Station Repeaters" by F. C. Kelcourse et al in the above-mentioned issue of the *Bell System Technical Journal.* In general, a bump equalizer includes a plurality of independently adjustable, serially connected equalizer networks or sections. Ideally, the frequency response of each of these sections is flat and constant over the operating band of the system with the exception of a predetermined, relatively narrow frequency range (called the effective range) in which the amplitude of that response is adjustable. The amplitude of the frequency response of each equalizer section is determined, insofar as it is adjustable, by a single control quantity or signal. Each equalizer section can be used to adjust the response of the equalizer in its effective range. By utilizing several sections the effective ranges of which are distributed over the transmission band of the system, any misalignment of the transmission line served by the equalizer in any portion of the transmission band can be corrected by appropriately adjusting the one or more equalizer sections which influence equalization in that portion of the transmission band.

Several types of apparatus for measuring misalignment and generating signals for controlling the several sections of a bump equalizer are known. The equalizer control apparatus discussed in the above-mentioned article by Kelcourse et al, for example, operates on the assumption that the effective ranges of the equalizer sections are mutually exclusive and that each section can be controlled on the basis of the level of a single pilot signal whose frequency is in the effective frequency range of that section.

In extremely broad band communications systems and in systems operating at very high frequencies, it is necessary to realize more nearly perfect equalization than is possible by the foregoing means. In particular, it becomes necessary to recognize and account for the fact that the frequency response of each equalizer section is neither perfectly flat nor constant outside the effective range of that section. As a consequence, equalizer control must be determined from a system of simultaneous relationships between equalizer misalignment and the effectiveness of each equalizer section in each portion of the operating frequency spectrum. In an actual system, this can be done either by relating equalizer misalignment at several pilot frequencies to equalizer section effectiveness at those frequencies or by relating average equalizer misalignment in several frequency ranges to equalizer section effectiveness averaged over those frequency ranges. Since the latter method will tend to smooth overall system frequency response, it is preferred. This method is discussed in detail in the concurrently filed application, Ser. No. 227,739 of C. Kao.

It will be readily apparent that the effectiveness of any of the foregoing methods, and particularly the latter method, will depend on the availability of accurate knowledge of the frequency response functions of the several equalizer sections. Since these functions are subject to change as the equalizer apparatus is adjusted, as it ages, as ambient conditions change, etc., it is necessary that accurate, up-to-date data regarding the response of each equalizer section be available for use in determining how the equalizer should be adjusted. These problems are discussed in the concurrently filed application, Ser. No. 227,740 of R. C. MacLean. In the equalizer control apparatus proposed by MacLean, the frequency response functions of the several sections of the equalizer are determined each time the equalizer is to be adjusted by comparing the frequency response of the equalizer before and after incremental adjustment of the control signal for each equalizer section. In accordance with the principles of the instant invention, similar information is determined by comparing the level of a test signal before and after each equalizer section for substantially all frequencies in the operating frequency band of the transmission system.

It is therefore an object of this invention to provide apparatus for controlling an adjustable equalizer which monitors the several sections of the equalizer to produce data regarding the frequency response functions of those sections for use in controlling the equalizer.

It is a more particular object of this invention to improve equalization in wideband analog transmission systems by means of adjustable equalizer control apparatus capable of determining the frequency response functions of the several sections of a bump equalizer and employing those functions in the generation of signals suitable for adjusting the equalizer.

It is another object of this invention to provide adjustable equalizer apparatus which is responsive to changes in its own frequency response functions.

It is yet another object of this invention to provide stable adjustable equalizer apparatus.

SUMMARY OF THE INVENTION

These and other objects of the invention are accomplished, in accordance with the principles of the invention, by using adjustable equalizer control apparatus which includes means for determining the effect of each section of a bump equalizer in each of a plurality of frequency ranges. This information is used in the processing of signals representative of overall equalizer misalignment in each of these same or similar frequency ranges to generate signals for controlling the several equalizer sections in such a manner that overall misalignment is reduced. Various modifications of the equalizer control apparatus of this invention are possible in accordance with the principles of the invention which insure stability of the system and speed convergence to optimum equalization.

Further features and objects of this invention, its nature, and various advantages, will be more apparent upon consideration of the attached drawing and the following detailed description.

DETAILED DESCRIPTION OF THE INVENTION

Figure 1:
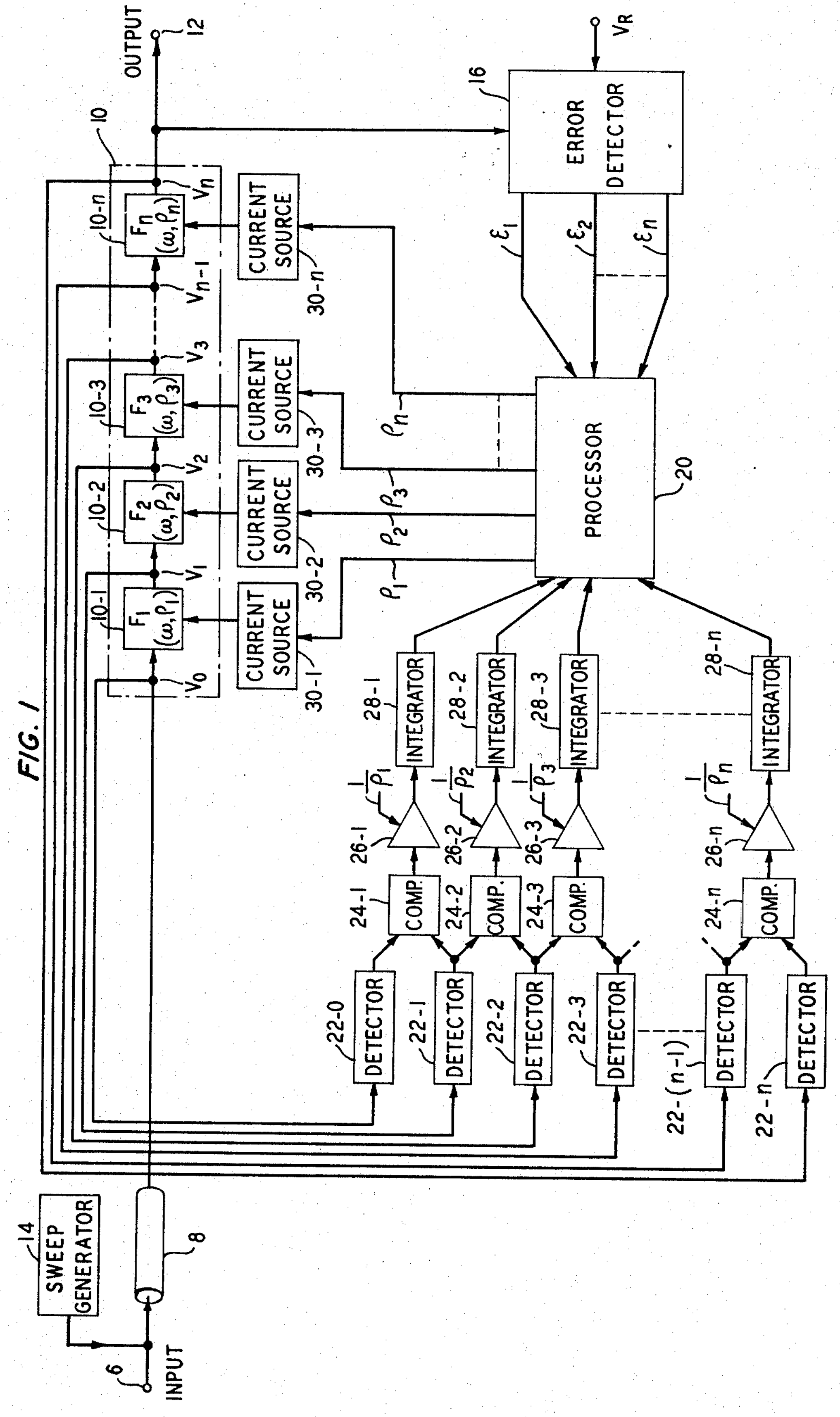
FIG. 1 is a block diagram of the adjustable equalizer control apparatus of this invention.

In FIG. 1, remotely located terminals 6 and 12 are connected by a broadband analog transmission system comprising coaxial cable section 8 and adjustable equalizer 10. Designating the transfer or frequency response functions of these two systems components $H(\omega)$ and $F(\omega)$ respectively, the object of equalization is to insure an overall flat frequency response between terminals 6 and 12, i.e., to insure that on a normalized basis $$|H(\omega)| \; |F(\omega)| \rightarrow 1 \qquad (1)$$

for all $\omega$ in the frequency band of the system.

Equalizer 10, constructed in accordance with principles well known in the equalizer art, comprises a plurality of separately adjustable, serially connected equalizer sections (e.g., Bode equalizers of the type discussed in the above-mentioned article by Kelcourse et al.) 10–1 through **10–*n*. Equalizer sections 10–1 through 10–*n* have transfer or frequency response functions $F_1(\omega,\rho_1)$ through $F_n(\omega,\rho_n)$, respectively, where $\rho_1$ through $\rho_n$ are a plurality of signal quantities employed for control of sections 10–1 through 10–*n***.

In general, each of frequency response functions $F_\mu(\omega,\rho_\mu)$ can be characterized by a normalized frequency response function $F_\mu(\omega)$ which is independent of the corresponding control quantity $\rho_\mu$. Each normalized response function $F_\mu(\omega)$ thus specifies the shape of the corresponding frequency response function $F_\mu$ while control quantity $\rho_\mu$ determines the amplitude of that function.

As mentioned briefly above, equalizer sections 10–1 through **10–*n*** may be chosen so that the amplitude of each of frequency response functions $F_\mu$ is primarily influenced by the corresponding control signal quantity $\rho_\mu$ in a predetermined, relatively narrow frequency range (i.e., the so-called effective range of the equalizer section) and is relatively constant outside that range. Such equalizer sections have a characteristic bump shaped frequency response. Hence the designation bump equalizer for apparatus made up of several such sections.

In order to satisfy relation 1, the apparatus of FIG. 1 must be periodically disconnected at terminals 6 and 12 and removed from service for testing and readjustment, i.e., equalization. As part of this operation, sweep signal generator 14 applies a signal of predetermined constant amplitude and varying frequency, the frequency varying monotonically from one end of the operating frequency band to the other. As will be discussed in greater detail below, one or more such sweeps may be required in the equalization process. For convenience in later discussion it will be assumed that a time interval T is required for one such sweep and for the calculations and adjustments made pursuant thereto.

As the above-mentioned sweep signal is applied to line 8, error detector 16 develops a plurality of error signals $\epsilon_1$ through $\epsilon_n$ each of which is proportional to the deviation of the signal level at terminal 12 from the desired output signal level $V_R$ in each of $n$ predetermined frequency ranges. Error signals $\epsilon_1$ through $\epsilon_n$ are therefore indicative of the misalignment of equalizer 10 in each of a plurality of predetermined frequency ranges. Error detector 16 may be any apparatus capable of comparing two analog signal levels and integrating the result over $n$ predetermined intervals. A reference signal generated by a suitable signal source (not shown) and having a level suitable for use in making the required comparison of signal levels is applied to error detector 16 by way of terminal $V_R$. The limits of the above-mentioned integrations may be determined in any well-known manner, e.g., by timing the integrations in synchronization with the operation of sweep signal generator 14. Apparatus for such purpose is well known and is not shown to avoid undue complication of the drawing. Error signals $\epsilon_1$ through $\epsilon_n$ may, of course, be either analog or digital depending on the mode in which it is most advantageous to further process them as discussed below. For convenience in that discussion, it will be assumed that error signals $\epsilon_1$ through $\epsilon_n$ are applied to processor 20 in digital form, i.e., as digitally coded signal quantities.

Apparatus similar to that thus far described is discussed in U. S. Pat. No. 3,573,667 issued to C. Kao et al. on Apr. 6, 1971 and in U. S. Pat. No. 3,633,129 issued to C. Kao et al. on Jan. 4, 1972. In the systems described in those patents, error signals analogous to signals $\epsilon_1$ through $\epsilon_n$ discussed above are used more or less directly to control the various sections of a bump equalizer, i.e., each error signal controls one equalizer section, it being assumed that the effective ranges of the equalizer sections are mutually exclusive. As mentioned in the above discussion of the prior art, more precise equalization, in accordance with the principles of this invention, is sometimes required. This more precise equalization is founded on a more complete analysis of the equalization problem which will now be discussed.

Analytically, each of error signals $\epsilon_1$ through $\epsilon_n$ is given by a relationship of the form $$\epsilon_i = x_i + \mu \sum_{\mu=1}^{n} b_{i\mu}\rho_\mu \qquad (2)$$

where $x_i$ is the misalignment of cable section 8 integrated or averaged over frequency range $i$, $b_{i\mu}$ is the normalized frequency response function $F_\mu$ of equalizer section $\mu$ integrated or averaged over frequency range $i$, and $\rho_\mu$ is, as defined above, the quantity which controls the amplitude of the frequency response function of equalizer section $\mu$. Contrary to the prior art assumption of mutual exclusivity in the effective ranges of the equalizer sections, relation (2) expresses what is actually the case, i.e., that each equalizer section $\mu$ influences the error signal in each frequency range $i$. Since it has been assumed that there are as many quantities $\epsilon$ as there are equalizer sections to be controlled (i.e., both $i$ and $\mu$ range between 1 and $n$), the system of equations exemplified by relation (2) is determinant and can be rewritten in matrix form as follows:

$$[\epsilon] = [x] + [B]\,[\rho] \qquad (3)$$

where $[\epsilon]$, $[x]$, and $[\rho]$ are vectors of the $\epsilon_i$, $x_i$, and $\rho$ respectively and $[B]$ is an $n$ by $n$ matrix of the $b_i$ . It will be readily apparent that since matrix $B$ and vector $\rho$ are known from the characteristics and present settings of equalizer sections 10–1 through 10–$n$ and the elements of vector $\epsilon$ have been measured as discussed above, relation (3) can be solved for the unknown vector $x$, i.e., the misalignment of cable section 8. Once vector $x$ is determined, new values for vector $\rho$ can be found satisfying relation (3) with vector $\epsilon$ set to zero as is required to equalize the system.

There are several assumptions in relations (2) and (3) which render the method of equalization outlined above potentially unsatisfactory for transmission systems operating with very wide frequency bands and/or at very high frequencies and where as a consequence equalization is particularly critical. It is assumed, for example, that the shape of the frequency response of each equalizer section can be defined for all frequencies in the operating band by a normalized function independent of the value of the corresponding control quality $\rho$. It is further assumed that this normalized function does not change with time. In fact, of course, the matrix $B$ of any given equalizer is subject to change both with time and as a result of adjustment of the equalizer. The equalizer of FIG. 1 is therefore provided with control apparatus arranged in accordance with the principles of this invention whereby these and other assumptions are avoided and equalization accordingly refined.

In the apparatus of FIG. 1, equalizer 10 is tapped before and after each of equalizer sections 10–1 through 10–$n$, i.e., at points $V_0$ through $V_n$. As sweep signal generator 14 applies a sweep signal to the line near input terminal 6, detectors 22–0 through 22–$n$ generate output signals proportional to the levels of the transmitted signal as it appears at points $V_0$ through $V_n$, respectively. The output signals of each adjacent pair of detectors 22–0 through 22–$n$ are compared in one of comparator devices 24–1 through 24–$n$ to produce $n$ output signals proportional to the attenuation or amplification effect (i.e., the frequency response) of each of the $n$ equalizer sections. Each of these comparator output signals is multiplied in the corresponding one of amplifiers or multipliers 26–1 through 26–$n$ by a quantity proportional to the reciprocal of the present value of the control quantity $\rho$ for the corresponding equalizer section, as shown symbolically in FIG. 1. Apparatus for inverting signals such as control quantities $\rho$ being well known, that apparatus is not shown to avoid undue complication of FIG. 1.

Each multiplier output signal is representative of the normalized frequency response function F of the corresponding equalizer section. Each of these signals is integrated by one of integrators 28–1 through 28–$n$ over $n$ frequency ranges corresponding to the $n$ frequency ranges for which there are error signals $\epsilon$ being generated by error detector 16. Each of integrators 28–1 through 28–$n$ therefore produces $n$ separate output signal quantities during any given sweep of the system frequency band by sweep signal generator 14. The integrations taking place in each of integrators 28–1 through 28–$n$ may therefore be timed in a manner similar to the timing of the integrators taking place simultaneously in error detector 16. Since it has been assumed that error signals $\epsilon$ are applied to processor 20 in digital form, the output quantities of integrators 28–1 through 28–$n$ are also conveniently either of that form or are converted to that form in any well-known manner before application to processor 20. The $n$ times $n$ quantities thus generated represent matrix $B$ of relation (3). However, because the elements of this matrix have been directly computed from the actual, present effect of each equalizer section in each frequency range, this matrix is largely free from the deleterious effects of the assumptions discussed above.

As the elements of matrix $B$ are generated, they are stored in processor 20. When generation of matrix $B$ is complete, processor 20 solves the system of equations given by relation (3) to obtain $n$ new values for control quantities $\rho_1$ through $\rho_n$. This can be done in substantially the manner indicated above, namely, by solving relation (3) for vector $x$, then setting all the elements of vector $\epsilon$ equal to zero and solving relation (3) again for vector $\rho$. Processor 20 may therefore be any suitable digital data processing apparatus, e.g., a general purpose digital computer programmed to solve systems of simultaneous linear equations or a suitable special purpose computer. Machine methods suitable for such calculations are discussed, for example, in Chapter 5 of *Introduction to Numerical Methods and FORTRAN Programming* by T. R. MaCalla (John Wiley & Sons, Inc., 1967).

The $n$ new values of control quantities $\rho_1$ through $\rho_n$ are applied to equalizer control signal sources 30–1 through 30–$n$, each of which produces a signal suitable for adjusting the corresponding section of equalizer 10. If, for example, Bode equalizer sections are employed in equalizer 10, each of signal sources 30 may be a controllable current source, the output of which is employed to control thermistor temperature in the corresponding equalizer network. Where processor 20 is digital computing apparatus, current sources 30–1 through **30–*n* may conveniently be digitally controllable current sources. Each current source generates an output current determined by the corresponding digitally coded control quantity $\rho$. Each of current sources 30 may includes a storage register for storing a given value of the applied control quantity $\rho$ until a new value for that quantity is supplied by processor 20 thereby enabling current sources 30**, once set, to continuously supply the required output current.

Although theoretically sufficient, the one-step adjustment process thus far described may not in some applications produce perfect equalization. This may result, for example, from changes in the matrix $B$ as adjustments are made, from nonreproducability in the control of equalizer section 10–1 through **10–*n*, etc. Accordingly, several repetitions of the adjustment procedure may be needed to produce optimum equalization, i.e., several successive sweep signals from sweep generator 14** each followed by readjustment of the equalizer sections as described above may be needed to produce optimum equalization.

In some applications the combination of equalizer 10 and the control apparatus may be potentially unstable (e.g., as a result of changes in the matrix $B$ from one adjustment to the next) with the result that each attempt to equalize the system as described above will cause over-compensation for existing misalignment thereby worsening rather than improving equalization. In such a case, repetition of the foregoing procedure will drive the equalizer apparatus further and further out of alignment.

To insure that stability of the equalization system of this invention, a predetermined gain factor may be introduced into each control loop to prevent the system from attempting one-step adjustment of equalizer 10. In addition, a minimum order overall system is achieved by making each of error quantities $\epsilon$ proportional to a linear combination of the differences between values of $\rho$ at two successive settings of equalizer 10. Accordingly, after completion of adjustment cycle $m$–1 (which takes place during time interval $m$T–T) and which corresponds to sweep $m$–1, error quantities $\epsilon$ are related to control quantities $\rho$ by a relation of the form $$[G][\epsilon(mT\text{-}T)] = [B(mT\text{-}T)][\Delta\rho(mT)] \quad (4)$$

where $[G]$ is a diagonal matrix of control loop gain factors and $[\Delta\rho(mT)]$ is a vector of the differences in signals $\rho$ between settings of equalizer 10 in time interval $mT\text{-}T$ and the next time interval $mT$, i.e., $$[\Delta\rho(mT)] = [\rho(mT)] - [\rho(mT\text{-}T)]. \quad (5)$$

In relation (4) matrix $B$ is expressed as a function of time to indicate the possibility that it may change from one setting of equalizer 10 to the next. Solving relation (4) for $[\Delta\rho(mT)]$ yields $$[\Delta\rho(mT)] = [G]\,[B(mT\text{-}T)]^{-1}\,[\epsilon(mT\text{-}T)]. \quad (6)$$

Control quantities $\rho$ needed for application to control signal sources 30 can, of course, be determined by summing all past values of $\Delta\rho$, that is $$[\rho(mT)] = \sum_{r=0}^{n} [\Delta\rho(rT)] + [\rho_o] \quad (7)$$

where $[\rho_o]$ is the vector of the initial settings of signals $\rho$. Substituting relation (6) into relation (7) yields $$[\rho(mT)] = [G]\sum_{r=0}^{m} [B(rT-T)]^{-1}[\epsilon(rT-T)] + [\rho_0] \quad (8)$$

Figure 2:
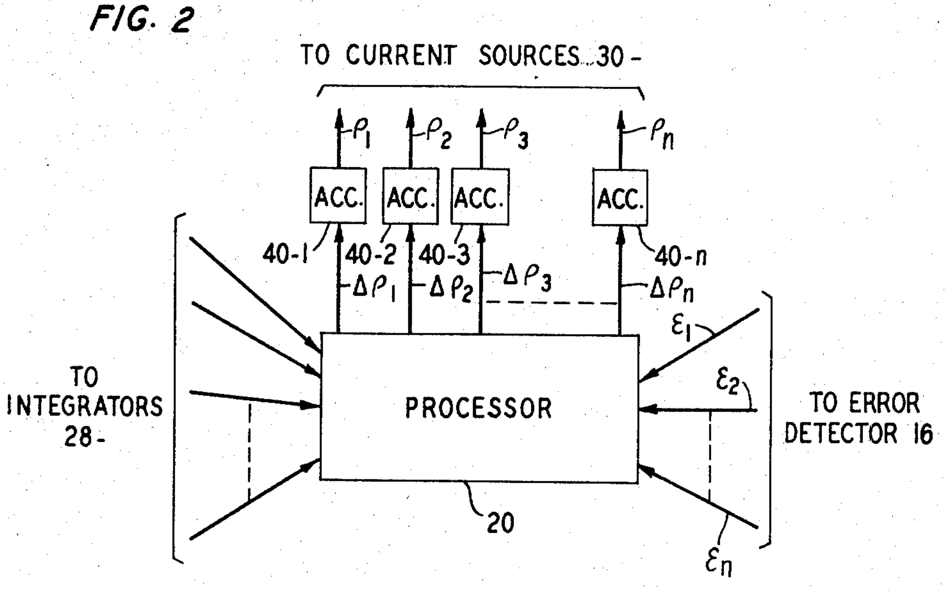
FIG. 2 is a block diagram showing how a part of the control apparatus of FIG. 1 may be modified according to the principles of this invention.

The apparatus of FIG. 1 may be modified in accordance with the principles of this invention as shown in FIG. 2 to realize the control function expressed by relation (8). In particular, processor 20 is modified to include the capability of multiplying the product of the inverse of matrix $B(mT\text{-}T)$ and vector $\epsilon(mT\text{-}T)$ by the diagonal gain matrix $G$. Where processor 20 is a general purpose digital computer, the program may be readily modified to include the necessary programming steps. In addition, since the quantities produced by processor 20 are now incremental adjustments, accumulators 40–1 through **40–*n* are included as shown in FIG. 2 to add the output quantities of processor 20** in successive adjustment cycles and produce control quantities $\rho_1$ through $\rho_n$, respectively, in accordance with relation (7).

Unless equalizer sections 10–1 through **10–*n* are inherently unstable, sufficiently small loop gains can always be found to insure stability of the overall system. Suitable gain factors can be determined empirically. Once a satisfactory set of loop gains has been found, they are installed in processor 20 of FIG. 2** as fixed matrix $G$.

The difference equation which describes the overall system of FIG. 2 can be linearized to further insure stability if, in accordance with the principles of this invention, relation (8) is rewritten as follows:

$$[\rho(mT)] = [G][B(mT-T)]^{-1}\sum_{r=0}^{m} [\epsilon(rT-T)] + [\rho_0] \quad (9)$$

It is to be noted that in relation (9) only $\epsilon$ appears inside the summation sign. Accordingly, relation (9) calls for the summation of successive values of error signals $\epsilon$ rather than successive values of $\Delta\rho$. In some applications the enhanced stability which results from using equation (9) instead of equation (8) may be advantageous. In particular, implementation of relation (9) tends to enable use of larger control loop gain factors with the result that optimum equalization can be achieved after fewer adjustment cycles.

Figure 3:
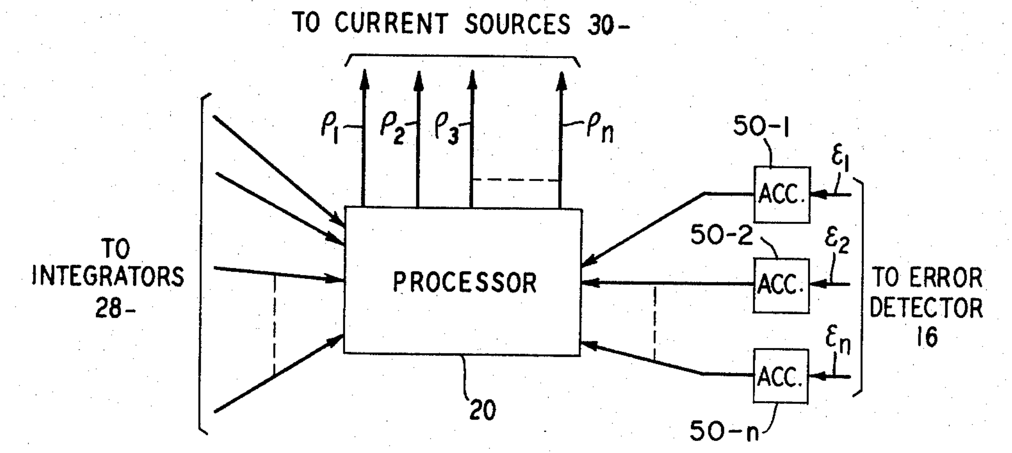
FIG. 3 is a block diagram showing another modification of the control apparatus of FIG. 1 in accordance with the principles of this invention.

The apparatus of FIG. 1 may be modified according to the principles of this invention as shown in FIG. 3 to implement equation (9). Processor 20 of FIG. 3 is substantially identical to processor 20 of FIG. 2, said processor being required to perform the same operations in each case. In the apparatus of FIG. 3, however, accumulators 50–1 through **50–*n* are included to perform the summations indicated in relation (9), i.e., to add the error quantities $\epsilon$ produced by error detector 16 in successive adjustment cycles to produce a plurality of accumulated error signals. It will be understood that the summations performed by accumulators 50–1 through 50–*n* are analogous to those performed by accumulators 40–1 through 40–*n* in the apparatus of FIG. 2**, but that the resulting control operation is linearized (as indicated by relation (9)) with the above-mentioned advantages attendant thereon.

It is to be understood that the embodiments shown and described herein are illustrative of the principles of this invention only and that modifications may be implemented by those skilled in the art without departing from the scope and spirit of the invention. For example, any of the required control signal processing may be accomplished by either analog or digital means. Moreover, where processor 20 is designed to operate in digital mode, conversions from analog to digital can be made wherever convenient for the processing of signals to be applied to processor.

What is claimed is:

1. Apparatus for controlling an adjustable equalizer, said equalizer having a plurality of independently adjustable equalizer sections, comprising:

means responsive to the input and output signals of each of said equalizer sections for developing a first plurality of output signals each respectively proportional to the amplitude of the frequency response of each of said equalizer sections in each of a plurality of predetermined frequency ranges;

means responsive to the output signal of said equalizer for developing a second plurality of output signals each respectively proportional to the misalignment of said equalizer in each of said frequency ranges;

means responsive to said first and second pluralities of output signals for producing a third plurality of output signals each respectively proportional to the amplitude of the frequency response of each of said equalizer sections which will reduce overall equalizer misalignment; and means responsive to said third plurality of output signals for adjusting said amplitudes of said frequency responses of said equalizer sections to reduce said overall equalizer misalignment.

2. Apparatus for controlling an adjustable equalizer, said equalizer comprising a plurality of serially connected equalizer sections each having a frequency response function the amplitude of which is determined by the level of a control signal, comprising:

means responsive to the input and output signals of each of said equalizer sections for developing a first plurality of output signals each respectively proportional to the amplitude of said frequency response of each of said equalizer sections in each of a plurality of predetermined frequency ranges;

means responsive to the output signal of said equalizer for developing a second plurality of output signals each respectively proportional to the misalignment of said equalizer in each of said frequency ranges;

means responsive to said first and second pluralities of output signals for producing a third plurality of output signals each respectively proportional to the amplitude of the frequency response function of each of said equalizer sections which will reduce overall equalizer misalignment; and means responsive to said third plurality of output signals for adjusting said levels of said control signals.

3. The apparatus defined in claim 2 wherein said means for developing said first plurality of output signals further comprises:

a plurality of detector means each respectively responsive to and developing an output signal proportional to the level of the signal at the interconnections of said serially connected equalizer sections;

a plurality of comparator means, one of said comparator means being associated with each of said equalizer sections, each developing an output signal proportional to the difference between the output signals of the pair of said detector means responsive to said signal levels at said interconnections of said associated equalizer section;

a plurality of amplifier means, one of said amplifier means being associated with each of said comparator means, each developing an output signal proportional to the output signal of said associated comparator means divided by a factor proportional to the level of said associated equalizer section control signal; and a plurality of integrator means, one of said amplifier means being associated with each of said amplifier means, each developing a plurality of output signals proportional to the output signals of said associated amplifier means integrated over each of said plurality of predetermined frequency ranges.

4. Adjustable equalizer control apparatus for generating a plurality of control signals for controlling the amplitudes of the frequency response functions of the several serially connected sections of an adjustable equalizer comprising:

a plurality of means, each responsive to the input and output signal levels of an associated equalizer section, for developing a first plurality of output signals proportional to the normalized amplitude of the frequency response of said associated equalizer sections in each of a plurality of predetermined frequency ranges;

means responsive to the output signal of said equalizer for developing a second plurality of output signals proportional to the misalignment of said equalizer in each of said plurality of frequency ranges; and means responsive to said first and second pluralities of output signals for developing said plurality of control signals.

5. The apparatus defined in claim 4 wherein each of said plurality of means comprises:

first detector means responsive to said associated equalizer section input signal level for developing an output signal proportional to said input signal level;

second detector means responsive to said associated equalizer section output signal level for developing an output signal proportional to said output signal level;

comparator means responsive to said output signals of said first and second detector means for developing an output signal proportional to the difference between said detector output signals;

normalizer means responsive to said output signal of said comparator means for developing an output signal proportional to said comparator output signal divided by the level of said associated equalizer section control signal; and integrator means responsive to said normalizer output signal for developing a plurality of output signals proportional to said normalizer output signal integrated over said plurality of frequency ranges.

6. Adjustable equalizer control apparatus for generating a control signal for controlling the amplitude of the frequency response function of at least one of the serially connected sections of an adjustable equalizer comprising:

first means responsive to the input and output signals of at least one of said equalizer sections for developing a plurality of output signals proportional to the amplitude of the frequency response function of said one of said equalizer sections in each of a plurality of predetermined frequency ranges;

second means responsive to the output signal of said equalizer for developing a plurality of error signals each proportional to the overall misalignment of said equalizer in each of said frequency ranges; and third means responsive to the output signals of said first and second means for generating said control signal.

7. The apparatus defined in claim 6 wherein said first means comprises:

first detector means responsive to said equalizer section input signal level for developing an output signal proportional to said input signal level;

second detector means responsive to said equalizer section output signal level for developing an output signal proportional to said output signal level;

comparator means responsive to said output signals of said first and second detector means for developing an output signal proportional to the difference between the levels of said first and second detector output signals;

normalizer means responsive to said output signal of said comparator means for developing an output signal proportional to said comparator output signal divided by the level of said control signal; and integrator means responsive to said normalizer output signal for developing a plurality of output signals proportional to said normalizer output signal integrated over said plurality of frequency ranges.

8. Adjustable equalizer control apparatus for generating a plurality of control signals for controlling the amplitudes of the frequency response functions of the several serially connected sections of an adjustable equalizer comprising:

a plurality of means, each responsive to the input and output signal levels of an associated equalizer section, for developing a first plurality of output signals proportional to the normalized amplitudes of the frequency response functions of said associated equalizer sections in each of a plurality of predetermined frequency ranges;

means responsive to the output signal of said equalizer for developing a second plurality of output signals proportional to the overall misalignment of said equalizer in each of said plurality of frequency ranges;

means responsive to said first and second pluralities of output signals for generating a third plurality of output signals each respectively proportional to the amount by which each of said frequency response function amplitudes must be changed to reduce said overall misalignment;

a plurality of accumulators, each respectively responsive to one signal in said third plurality of output signals, for accumulating successive values of each signal in said third plurality of output signals to produce said plurality of control signals.

9. The apparatus defined in claim 8 wherein each of said plurality of means comprises:

first detector means responsive to said associated equalizer section input signal level for developing an output signal proportional to said input signal level;

second detector means responsive to said associated equalizer section output signal level for developing an output signal proportional to said output signal level;

comparator means responsive to said output signals of said first and second detector means for developing an output signal proportional to the difference between said detector output signals;

normalizer means responsive to said output signal of said comparator means for developing an output signal proportional to said comparator output signal divided by the level of said associated equalizer section control signal; and integrator means responsive to said normalizer output signal for developing a plurality of output signals proportional to said normalizer output signal integrated over said plurality of frequency ranges.

10. Adjustable equalizer control apparatus for generating a plurality of control signals for controlling the amplitudes of the frequency response functions of the several serially connected sections of an adjustable equalizer comprising:

a plurality of means, each responsive to the input and output signal levels of an associated equalizer section, for developing a first plurality of output signals proportional to the normalized amplitudes of the frequency response functions of said associated equalizer sections in each of a plurality of predetermined frequency ranges;

means responsive to the output signal of said equalizer for developing a second plurality of output signals proportional to the overall misalignment of said equalizer in each of said plurality of frequency ranges;

a plurality of accumulator means respectively responsive to said second plurality of output signals for developing a third plurality of output signals respectively proportional to accumulated values of said third plurality of output signals; and means responsive to said first and third pluralities of output signals for developing said plurality of control signals.

11. The apparatus defined in claim 10 wherein each of said plurality of means comprises:

first detector means responsive to said associated equalizer section input signal level for developing an output signal proportion to said input signal level;

second detector means responsive to said associated equalizer section output signal level for developing an output signal proportional to said output signal level;

comparator means responsive to said output signals of said first and second detector means for developing an output signal proportional to the difference between said detector output signals;

normalizer means responsive to said output signal of said comparator means for developing an output signal proportional to said comparator output signal divided by the level of said associated equalizer section control signal; and integrator means responsive to said normalizer output signal for developing a plurality of output signals proportional to said normalizer output signal integrated over said plurality of frequency ranges.

* * * * *